(12) United States Patent
Malladi et al.

(10) Patent No.: US 8,019,032 B2
(45) Date of Patent: Sep. 13, 2011

(54) METHOD AND SYSTEM FOR CHANNEL EQUALIZATION

(75) Inventors: Durga Prasad Malladi, San Diego, CA (US); Byoung-Hoon Kim, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 832 days.

(21) Appl. No.: 11/293,527

(22) Filed: Dec. 2, 2005

(65) Prior Publication Data

US 2006/0176987 A1 Aug. 10, 2006

Related U.S. Application Data

(60) Provisional application No. 60/650,042, filed on Feb. 4, 2005.

(51) Int. Cl.
*H04B 1/10* (2006.01)

(52) U.S. Cl. ............ 375/350; 375/224; 375/285

(58) Field of Classification Search .......... 375/224, 375/229, 285, 340, 346, 348, 350
See application file for complete search history.

(56) References Cited

U.S. PATENT DOCUMENTS

| | | | | |
|---|---|---|---|---|
| 4,709,374 A * | 11/1987 | Farrow | | 375/231 |
| 6,314,147 B1 * | 11/2001 | Liang et al. | | 375/346 |
| 6,434,084 B1 * | 8/2002 | Schultz | | 367/81 |
| 6,873,596 B2 | 3/2005 | Zhang et al. | | |
| 7,023,928 B2 * | 4/2006 | Laroia et al. | | 375/260 |
| 7,203,230 B2 * | 4/2007 | Vaananen | | 375/229 |
| 7,298,778 B2 * | 11/2007 | Visoz et al. | | 375/148 |
| 7,310,304 B2 * | 12/2007 | Mody et al. | | 370/208 |
| 7,412,005 B2 * | 8/2008 | Wang et al. | | 375/260 |
| 2003/0026371 A1 * | 2/2003 | Laroia et al. | | 375/362 |
| 2004/0091057 A1 * | 5/2004 | Yoshida | | 375/260 |

(Continued)

FOREIGN PATENT DOCUMENTS

AU 3046201 8/2001

(Continued)

OTHER PUBLICATIONS

Kadel G. "Diversity and Equalization in Frequency Domain a Robust and Flexible Receiver Technology for Broadband Mobile Communication Systems," Vehicular Technology Conference, 1997, IEEE. 47th Phoenix, AZ, USA May 4-7, 1997, New York, NY, USA, pp. 894-898.

(Continued)

*Primary Examiner* — Jean B Corrielus
(74) *Attorney, Agent, or Firm* — Stanton Braden (57) ABSTRACT

One embodiment includes a method of receiving a transmitted signal. The method comprises receiving a signal transmitted over a channel. The signal comprises a known signal and an information signal. The method further includes determining at least one indicator of channel characteristics based at least in part on the portion of the known signal. The method further includes generating a first value indicative of the information signal based at least in part on the at least one indicator of the channel characteristics. The first value comprises an error signal. The method further comprises removing the error signal from the first estimate of the signal based at least in part on the portion of the known signal. Other embodiments include systems for performing the method and methods of making such systems.

24 Claims, 7 Drawing Sheets

U.S. PATENT DOCUMENTS

| | | |
|---|---|---|
| 2004/0203812 A1 | 10/2004 | Malladi |
| 2005/0013348 A1* | 1/2005 | Visoz et al. .................. 375/148 |
| 2005/0185724 A1* | 8/2005 | Wang et al. .................. 375/260 |
| 2005/0207334 A1* | 9/2005 | Hadad .......................... 370/203 |

FOREIGN PATENT DOCUMENTS

| | | |
|---|---|---|
| JP | 08181638 | 7/1996 |
| JP | 2000224148 | 8/2000 |
| JP | 2000244371 A | 9/2000 |
| JP | 2000286817 | 10/2000 |
| JP | 2001196978 | 7/2001 |
| JP | 2004530365 | 9/2004 |
| JP | 2004297536 | 10/2004 |
| WO | 02087182 | 10/2002 |
| WO | WO2004059936 A1 | 7/2004 |

OTHER PUBLICATIONS

International Search Report-PCT/US06/004248, European Patent Office, Jun. 7, 2006.

Written Opinion—PCT/US06/004248, European Patent Office, Berlin, Jun. 7, 2006.

International Preliminary Report on Patentability—PCT/US06/004248—The International Bureau of WIPO, Geneva, Switzerland—Aug. 7, 2007.

\* cited by examiner

METHOD AND SYSTEM FOR CHANNEL EQUALIZATION

CLAIM OF PRIORITY UNDER 35 U.S.C. §119

The present Application for Patent claims priority to Provisional Application Ser. No. 60/650,042 entitled "FREQUENCY DOMAIN EQUALIZATION IN THE PRESENCE OF HIGH DOPPLER" filed Feb. 4, 2005 and assigned to the assignee hereof and hereby expressly incorporated by reference herein.

FIELD

The present invention relates to methods and systems for wireless communications, and more specifically, to methods and systems of frequency domain equalization.

BACKGROUND

In communications systems with higher data rates, e.g., data rates in the range of 50-200 Mbps, errors in received data may result in retransmission delays that prevent full utilization of the available bandwidth. One way of reducing retransmission delays is to reduce bit error rates (BER) in the received signal.

More particularly, during communication over a wireless channel, the channel behavior changes over time, thereby affecting (e.g., increasing errors in) the signals transmitted over the channel. It is desirable to predict or characterize the channel behavior over time in order to compensate for such variations in channel characteristics upon receiving the transmitted signals. In certain systems, channel equalization is implemented in the time domain to estimate the transmitted signal more accurately. However, equalization in the time domain demands intense computational power in the receiver and complicates circuitry. Moreover, corrections in the time domain are further complicated by the presence of noise, such as white noise over the channel. Hence, there is a need to simplify the computational complexity in estimating channel behavior and correcting signals transmitted over the channel.

SUMMARY

One aspect of the invention comprises a method of processing a signal. The method comprises receiving a signal transmitted over a channel. The signal comprises an information signal and at least a portion of known signal. The method further comprises determining at least one indicator of channel characteristics based at least in part on the portion of the known signal. The method further comprises generating a first value indicative of the information signal based at least in part on the at least one indicator of the channel characteristics. The first value comprises an error signal. The method further comprises removing the error signal from the first estimate of the signal based at least in part on the portion of the known signal.

Another aspect of the invention comprises a device configured to receive a signal transmitted over a channel. The signal comprises an information signal and at least a portion of known signal. The device comprises a first circuit configured to determine at least one indicator of channel characteristics based at least in part on the portion of the known signal. The device further comprises a second circuit configured to generate a first value indicative of the information signal based at least in part on the at least one indicator of the channel characteristics. The first value comprises an error signal. The device further comprises a third circuit configured to remove the error signal from the first estimate of the signal based at least in part on the portion of the known signal.

Another aspect of the invention comprises a device configured to receive a signal transmitted over a channel. The signal comprises an information signal and at least a portion of known signal. The device comprises means for determining at least one indicator of channel characteristics based at least in part on the portion of the known signal. The device further comprises means for generating a first value indicative of the information signal based at least in part on the at least one indicator of the channel characteristics. The first value comprises an error signal. The device further comprises means for removing the error signal from the first estimate of the signal based at least in part on the portion of the known signal.

DETAILED DESCRIPTION

The following detailed description is directed to certain specific embodiments of the invention. However, the invention can be embodied in a multitude of different ways as defined and covered by the claims. In this description, reference is made to the drawings wherein like parts are designated with like numerals throughout.

In one embodiment, a receiver receives signals transmitted over a radio frequency (RF) channel. The signals comprise a known signal, e.g., a pilot signal, and an unknown signal, e.g., a data signal. The receiver makes an estimate of characteristics of the communications channel based at least in part on at least a received portion of the known signal. The receiver generates a first estimate of the unknown signal based at least in part on the estimated channel characteristics. The first estimate of the unknown signal comprises an error signal, e.g., residual intersymbol interference (ISI). The receiver determines an estimate of the error signal based at least in part on the known signal. The receiver removes the error signal from the first estimate of the signal based at least in part on the error signal estimate.

Figure 1:
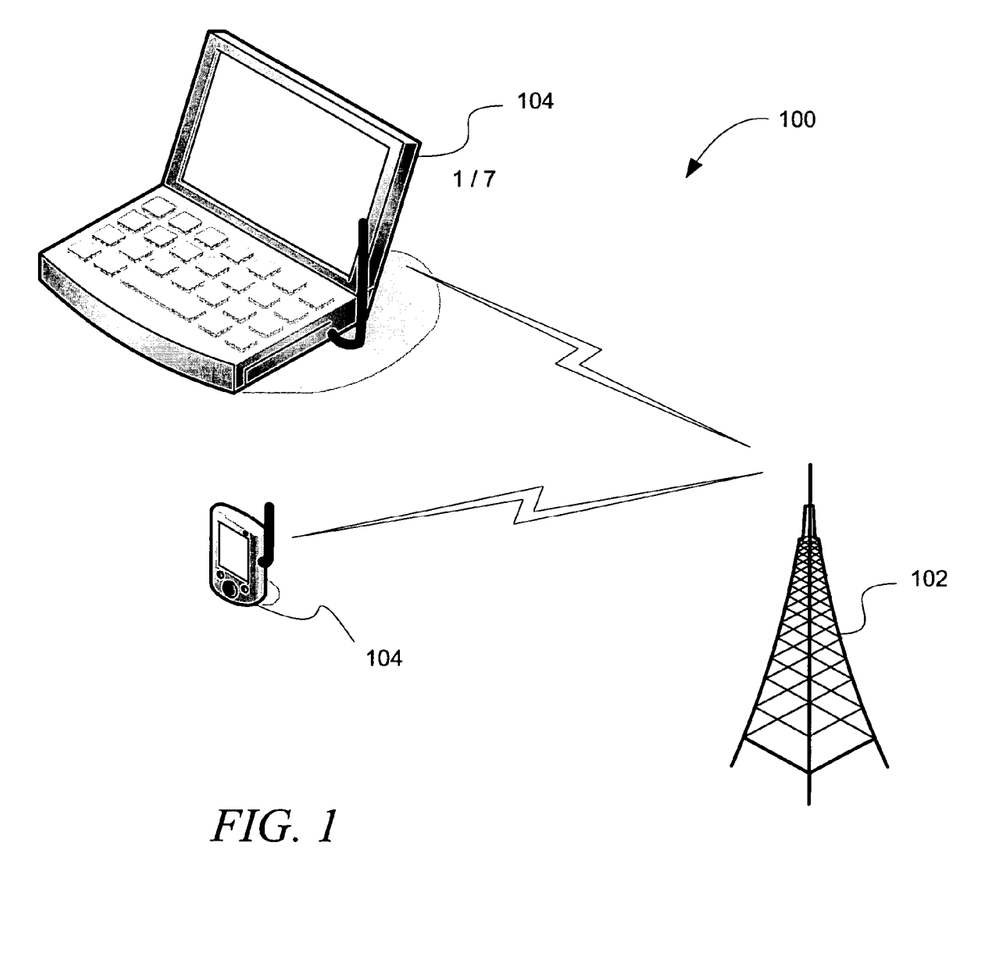
FIG. 1 illustrates an overview of an exemplary wireless communications system.

FIG. 1 illustrates an overview of an exemplary wireless communications system 100. In the exemplary embodiment, the communications system 100 includes one or more base stations 102 and one or more user terminals 104. In the exemplary embodiment, the communications system is configured to operate as a cellular radio network. A cellular radio network includes one or more base stations 102. Each base station 102 provides communications to different areas ("cells") (which may overlap) in order to provide radio coverage over a wider area than the area of one cell. The user terminals 104 may be fixed in location or mobile. Various handoff techniques may be used to allow moving user terminals 104 to communicate with different base stations 102 as such moving user terminals 104 pass into or through cells. In other embodiments, the communications system 100 may include point-to-point communications between user terminals 102 or one way communications links. Moreover, certain embodiments are discussed herein with reference to wireless communications using a radio frequency (RF) carrier. However, in other embodiments, the communications network may include other communication media such as optical signals or communications over wired connections.

Various embodiments of the system 100 may communicate over one or more channels in one or more RF frequency bands, e.g., frequency bands commonly referred to as 800 MHz, 850 MHz, 900 MHz, 1800 MHz, 1900 MHz, or 2000 MHz. Embodiments of the communications system 100 include an air interface that determines how the communication system operates the radio link between the base station 102 and the user terminals 104. For example, the communications system 100 may use a code division multiple access (CDMA) based air interface or a time division multiple access (TDMA) air interface. In one exemplary embodiment, the communications system 100 includes a wideband CDMA (W-CDMA) air interface utilizing a 5 MHz channel in the 1900 MHz band. Typically, only 3.84 MHz of this 5 MHz band is available for use.

Certain types of data transmission can be sensitive to retransmission delays, e.g. voice and common internet protocols such as TCP (Transport Control Protocol). For example, TCP connections generally do not fully utilize available channel bandwidth if transmission times (including times to retransmit lost data in lower level communication layers) are too large. For example, in one embodiment, data rates in the range of 50 Mbps can be achieved with a TCP SER (segment error rate) is in the range of 2×10-5 to 5×10-6. In one embodiment, the bit error rate (BER) of the communications system 100, and thus ultimately the segment error rates of higher level protocols such as TCP, are reduced by performing a channel equalization of the received signal.

A channel refers to a communications medium over which a signal is transmitted. Generally, channels are not perfect, e.g., a channel generally has time and/or frequency dependent characteristics that affect a signal transmitted over the channel. Mathematically, a channel may be represented or characterized by a channel impulse response, h(t), that relates a signal input, e.g., transmitted, to the channel to a signal output, e.g., received, from the channel. Channel equalization generally refers to a process by which a received signal is adjusted in response to dynamic characteristics of the channel over which the signal is sent.

Equalization may be performed in the time domain or frequency domain.

However, time domain equalizers may be computationally complex. Moreover, finite length time domain equalizers tend to have a performance loss as in certain channel conditions. In one embodiment, the invention provides a device comprising a frequency domain equalizer that is computationally efficient and that compensates for Doppler effects.

In one embodiment, as is set forth in further detail below, the system 100 performs channel equalization by communicating a known signal to the receiver along with a data signal. The data signal may contain one or more forms of data such as voice or other data. For example, the data signal may include TCP data communicated over at least in part an IP (Internet Protocol) network. The receiver identifies the known signal and uses it to estimate the characteristics of the channel. This channel estimate is used to perform channel equalization in the frequency domain.

Intersymbol interference (ISI) generally refers to interference between pulses (corresponding to different symbols in the data) in a signal that may occur when adjacent pulses become dispersed in time so as to overlap with each other. When this overlap becomes too great, a receiver may no longer be able to correctly discriminate or identify each pulse. In one embodiment, the equalized signal may include intersymbol interference (ISI) that has not been removed by the equalization. In one such embodiment, this residual ISI is removed by using the difference between the known signal and a received version of the known signal to estimate the residual ISI.

Figure 2:
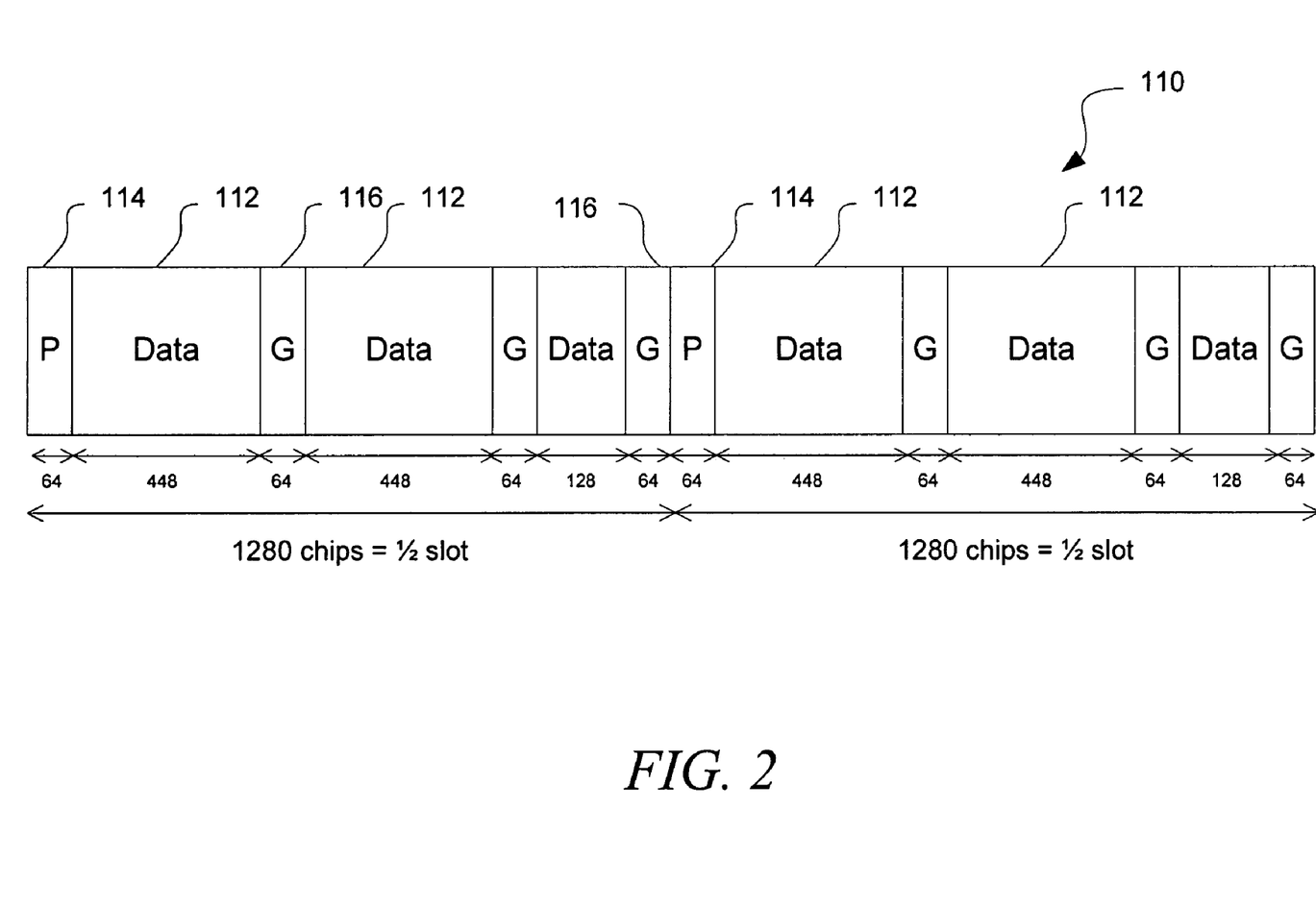
FIG. 2 is a block diagram illustrating an exemplary data frame structure for transmission in one embodiment of the system of FIG. 1.

FIG. 2 is a block diagram illustrating an exemplary data frame structure for transmission in one embodiment of the communications system 100, e.g., High Speed Downlink Packet Access (HSDPA) system. HSDPA is a packet-based data service in wideband code division multiple access (W-CDMA) systems in which data is transmitted to a receiver during time slots 110. In one embodiment, the data comprises "chips" that represent one or more bits of user data, such as voice, image, video, or other data. For example, bits of user data may be coded, for example, using a forward error correction code, into symbols. Each of the symbols may be further encoded into a larger number of chips by applying "spreading" code. A spreading code is used in air interfaces such as CDMA to create a spread spectrum signal, e.g., a signal which is transmitted in a frequency band that is considerably wider than the frequency content of the user data.

In the exemplary structure of FIG. 2, the time slot 110 includes two sub-slots of 1280 chips each. Each sub-slot includes three data blocks 112, two of 448 chips and one of 128 chips. The exemplary time slot 110 also includes 64 bit prefixes 114 and 64 bit suffixes 116 separating the data blocks 112. A known, or pilot, signal xp(t) is communicated in the prefixes 114 and suffixes 116 so that the transmitter 302 communicates a known signal xp(t) and a data signal xd(t) within each slot. In one embodiment, the known signal is the same in each time slot. For example, the known data may be selected to have a frequency response that is constant across the entire bandwidth. Such a sequences may include polyphase sequences, $x_p[n]=e^{-j\pi n^2/P} \forall 0 \leq n \leq P-1$, with P being a finite integer representing the length of the known or pilot sequence, e.g., 64 in the embodiment illustrated in FIG. 2. In one embodiment, the pilot sequence comprises a signal that is free of spectral nulls, e.g., Xp(f) (xp(t) in frequency space) is selected to be different from zero.

In another embodiment, the known signal, xp(t), is a signal communicated on a different code channel, e.g., a pilot channel signal of a CDMA system. A portion of the pilot signal received just before, just after, or concurrently with the data signal may be used as the known signal. In one embodiment, the pilot channel of a CDMA system is encoded with a pseudorandom number (PN) sequence. Thus, the known signal xp(t) in such an embodiment of the system 100 is time varying and depends on the position within the PN sequence. In other embodiments, the pilot signal may include any signal that is known.

Figure 3:
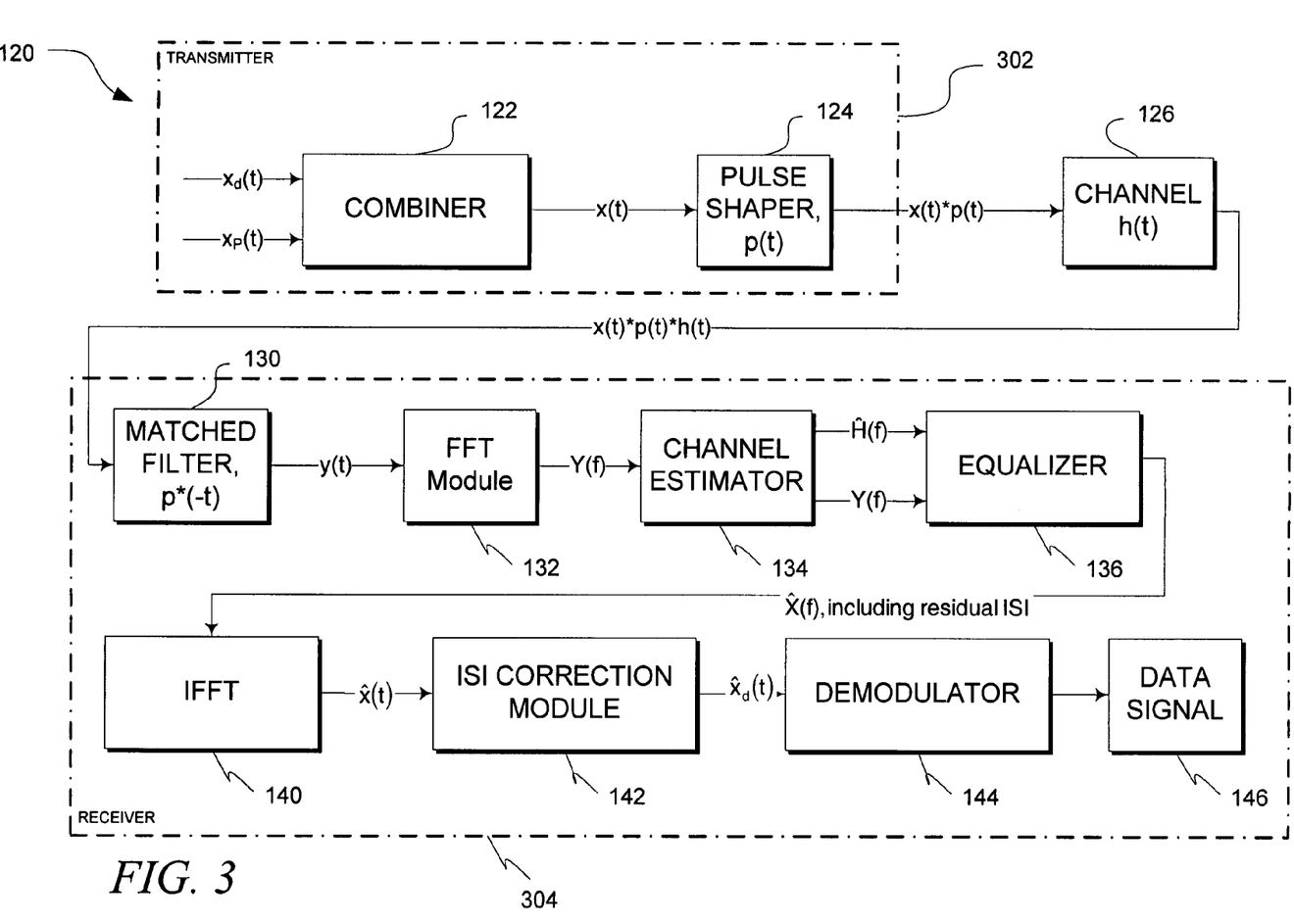
FIG. 3 is a block diagram illustrating in further detail the exemplary wireless communications system of FIG. 1.

FIG. 3 is a block diagram illustrating in further detail the exemplary wireless communications system 100. In various embodiments, the functional blocks illustrated in FIG. 3 may be implemented by a processor executing software instructions, as a digital circuit, as an analog circuit, or by a combination thereof. The block diagram illustrates portions of both a transmitter 302 and a receiver 304 in the system 100. In particular, in one embodiment, the transmitter 302 may comprise blocks 122-124 and the receiver 304 may comprise the blocks 130-146. In one embodiment, the receiver 304 comprises one or more integrated circuits that are formed using semiconductor manufacturing techniques. The integrated circuits may include at least one of a general purpose processor, an application specific integrated circuit (ASIC), a digital signal processor (DSP), other suitable hardware, or a combination thereof. In one embodiment, two or more of the blocks 130-146 are formed on a single integrated circuit. In one embodiment, the transmitter 302 comprises a base station 102 and the receiver 304 comprises a user terminal 104. In one embodiment, communication in the system 100 is asymmetric, e.g., only the base station 102 includes the transmitter 302 portion of FIG. 3 and only the user terminal 104 includes the receiver 304 portion. In other embodiments, communication in the system 100 is symmetric, both the base station 102 and the user terminal 104 include both the transmitting and receiver functional blocks of FIG. 3.

In one embodiment, the transmitter 302 includes a combiner 122 that combines a known signal xp(t) with the data signal xd(t) to form a signal x(t). In one embodiment, the combiner 122 combines the known signal xp(t) with the data signal xd(t) to form the data stream as shown in the slot 110 of FIG. 2. In another embodiment of a CDMA system, the combiner 122 combines the known signal xp(t) with the data signal xd(t) by placing the known signal xp(t) in a one code channel, e.g., a pilot channel, and the data signal xd(t) in a another code channel, e.g., a data channel, in compliance with CDMA systems.

The transmitter 302 further includes a pulse shaper 124 that generates a bandwidth limited signal by effectively convolving a pulse shaping signal, p(t) with the signal x(t). This bandwidth limited signal is transmitted over the channel, represented as the channel impulse response h(t), and illustrated as a block 126 in FIG. 3. The operation of the channel may be represented as a convolution of the channel impulse response, h(t), with the shaped signal x(t)*p(t), e.g., x(t)*p(t) *h(t).

On a receiver, in one embodiment, a matched filter 130 (matched with the pulse shaping block 124) is applied to the signal to receive the transmitted signal. The matched filter 130 applies the complex conjugate, p*(−t), of the pulse shaping signal to the signal received from the channel, x(t)*p(t) *h(t) to produce a received signal, y(t). Mathematically, the received signal, y(t), that is output from the matched filter 130 may be represented as:

$$y(t)=x(t)*p(t)*h(t)*p*(-t).$$ (Eqn. 1)

The received signal y(t) comprises a received data signal yd(t) and a received known signal yp(t) that correspond to the transmitted data signal xd(t) and the transmitted known signal xp(t).

The receiver 304 further includes a fast Fourier Transform (FFT) module 132 that transforms the received signal y(t) from the time domain to a frequency domain signal Y(f). By treating the pulse shaping and match filtering as comprising an effective transmission channel, the received signal in the frequency domain may be represented as the product of the transmitted signal, X(f), and the transfer function of the channel, H(f):

$$Y(f)=X(f)\cdot H(f), \text{ where "·" represents multiplication.}$$ (Eqn. 2)

In one embodiment, an estimate of the transmitted signal, $\hat{X}(f)$, is obtained based an estimate of the channel characteristics, $\hat{H}(f)$. In particular, the receiver 304 includes a channel estimator 134 that determines the estimate, $\hat{H}(f)$, of the channel characteristics based on the portion of the received known signal, yP(t) and YP(f) that corresponds to the transmitted known signal xP(t) and XP(f), respectively. For example, in one such embodiment, the known signal, xP(t), and the received version of the known signal, yP(t), may be represented in discrete frequency space as XP[k] and YP[k], respectively. Similarly, the transfer function of the channel, H(f), in discrete frequency space may be represented as H[k]. Assuming the presence of additive white noise in the system, represented as W[k], and assuming that the known signal XP[k] comprises a signal having an integer length of P chips, or pulses, the received known signal YP[k] may be expressed in discrete form as:

$$Y_P[k]=\sqrt{P}\cdot H[k]\cdot X_P[k]+W[k].$$ (Eqn. 3)

This equation may be solved using the relationship between the known transmitted signal (in discrete frequency space) XP[k] and known received signal (in discrete frequency space) YP[k] in order to determine an estimate of the channel characteristics $\hat{H}(k)$. One method of solving such an equation includes application of a statistical solution known as a minimum mean squared estimate (MMSE) technique. In one embodiment, an MMSE solution for the channel estimate $\hat{H}[k]$, may be obtained in discrete frequency space, as follows:

$$\hat{H}[k] = \frac{R_{cc}[k]\cdot \sqrt{P}\cdot X_P^*[k]}{P\cdot R_{cc}[k]\cdot |X_P[k]|^2 + R_{ww}[k]}\cdot Y[k],$$

where average channel statistics are represented as $R_{CC}=\{H[k]|^2\}$ (Eqn. 4) and an average noise variance as $R_{ww}[k]=E\{W[k]|^2\}$ In one embodiment, the channel and noise variance statistics, Rcc and Rww, may be derived from previously received data. For example, Rcc may be computed from a long term average of $\hat{H}[k]$, such as over a number of frames. Rww may be estimated based on errors in the pilot samples. In another embodiment, a zero forcing (ZF) (in which the noise variance is taken to its zero limit) MMSE discrete solution for $\hat{H}[k]$, may be obtained as follows:

$$\hat{H}[k] = \frac{1}{\sqrt{P}}\frac{1}{X_P[k]}Y_P[k]$$ (Eqn. 5)

Using the output of the channel estimator 134, the receiver 304 further comprises an equalizer 136 that uses the channel estimate, $\hat{H}(f)$ to filter the received signal Y(f) in order to obtain an estimate X(f) of the transmitted data signal. As noted above, the received signal, Y(f), equals the product of the transmitted signal, X(f) and the channel transfer function H(F). A frequency domain estimate $\hat{X}(f)$ of the transmitted signal x(t) can thus be obtained by taking the product of the received signal, Y(f) with the complex conjugate of the channel transfer function, H*(f). Taking into account the presence of additive white noise, W(f), the estimated transmitted signal can be represented as:

$$\hat{X}(f)=X(f)\cdot H(f)\cdot H^*(f)+W(f)=Y(f)\cdot H^*(f)+W(f).$$ (Eqn. 6)

A minimum mean square estimate (MMSE) equalizer solution to this estimate of the received signal, $\hat{X}(f)$ may be represented as:

$$\hat{X}(f) = \frac{Y(f) \cdot \hat{H}^*(f)}{|\hat{H}(f)|^2 + \sigma^2}, \quad \text{(Eqn. 7)}$$

where $\sigma^2$ represents a noise variance term related to the noise term W(f).

The noise variance term in the MMSE solution, $\sigma^2$, operates as a bias term to eliminate zeros that would introduce discontinuities into the equation. In one embodiment, a discrete frequency space MMSE solution to the above representation of the received signal $\hat{X}(f)$ may be expressed as follows:

$$\hat{X}(k) = \frac{R_{bb}[k] \cdot \sqrt{P} \cdot \hat{H}^*[k]}{P \cdot R_{bb}[k] \cdot |\hat{H}[k]|^2 + R_{ww}[k]} \cdot Y[k],$$

where $R_{bb} = E\{|X[k]|^2\}$ and $R_{ww}[k] = E\{|W[k]|^2\}$ and (Eqn. 8) where W represents the noise in the data signal.

In such an embodiment, the data statistics Rbb and noise statistics Rww may be derived from estimating the signal energy of the received data or from previously received data. Rbb may be derived from the received data signal constellation energy or from the ratio of traffic or data energy to pilot energy. Rww may be estimated based on errors in the pilot samples.

As noted above, the estimated signal $\hat{X}(f)$ includes residual ISI after performing an inverse FFT. In one embodiment, this residual ISI is corrected to obtain a estimate $\hat{x}_d(t)$ of the transmitted data signal, $x_d(t)$ In particular, the receiver 304 further includes an inverse FFT (IFFT) module 140 that converts the equalized signal $\hat{X}(f)$ to a time domain signal $\hat{x}(t)$. The receiver 304 further comprises an ISI correction module 142 that corrects for the residual ISI to derive an estimate $\hat{x}_d(t)$ of the data signal $x_d(t)$. In one embodiment, as discussed in further detail with reference to FIG. 7, the ISI correction module 142 corrects for the residual ISI based on the difference between a known signal and received version of that known signal, e.g. $x_P(t)$ and $\hat{x}_P(t)$. The receiver 304 further includes a demodulator 144 that further processes the estimated data signal $\hat{x}_d(t)$. This processing may include, for example, recovering the signal from the modulating signal using a demodulation scheme such as QPSK, 16-QAM, 64-QAM, or any other suitable scheme.

Figure 4:
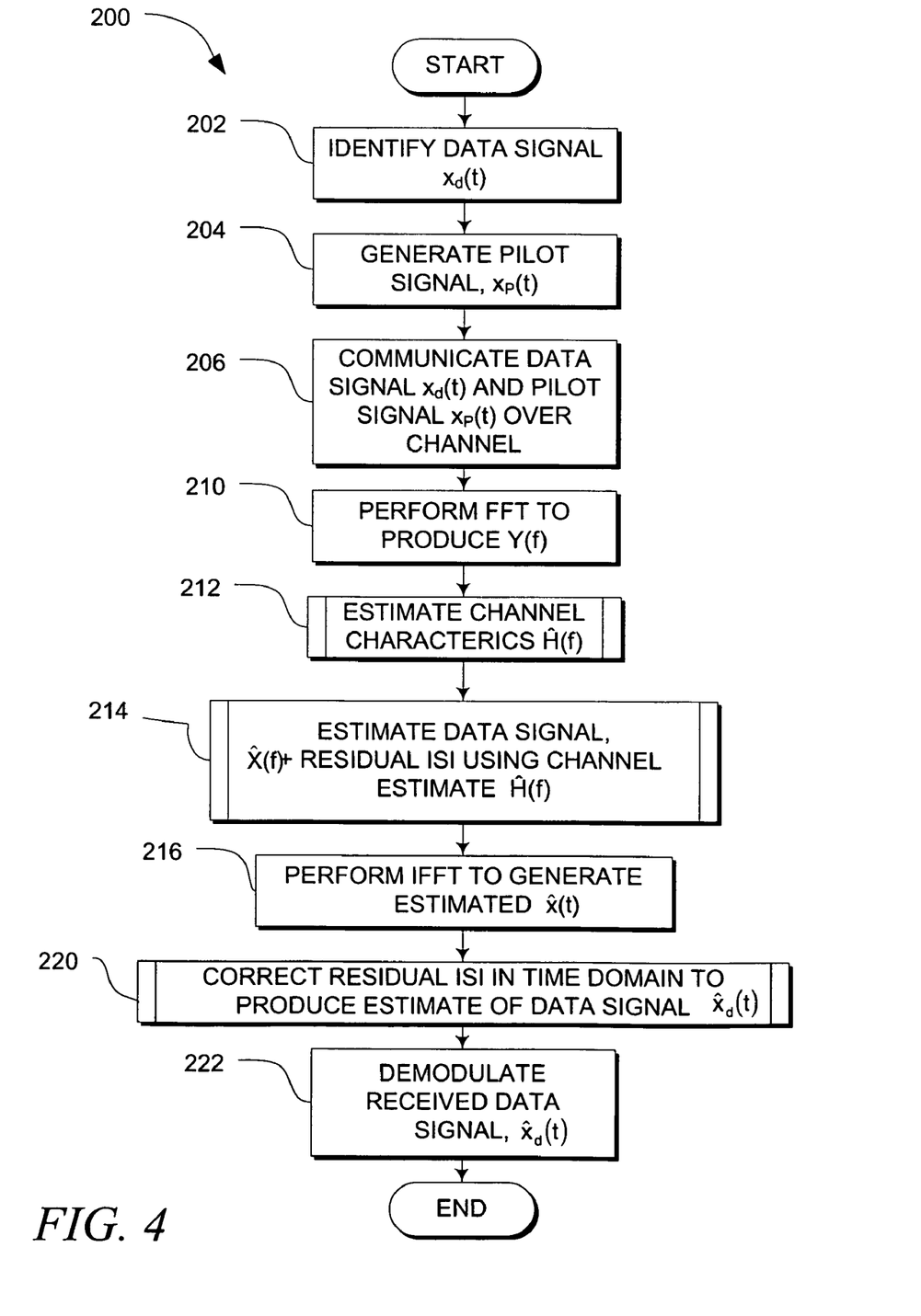
FIG. 4 is a flowchart illustrating one embodiment of a method of communicating data in the exemplary system illustrated by FIG. 3.

FIG. 4 is a flowchart illustrating one embodiment of a method 200 of communicating data in the exemplary system 100 of FIG. 3. The method 200 begins at a block 202 in which a transmitter, e.g., the base station 102, identifies the data signal $x_D(t)$ for transmission. In one embodiment, the data signal is at least partially modulated, e.g., the data signal $x_D(t)$, includes data such as sound, video, voice, or other data that has been coded with one or more error correction codes. Moving to a block 204, the transmitter 302 generates a known, or pilot, signal $x_P(t)$. In one embodiment, the pilot signal $x_P(t)$ comprises data pulses, chips, that are inserted as a prefix (e.g., before) or suffix to (e.g., after) a data block to be transmitted during a time slot. In one embodiment, the pilot signal is 64 chips in length.

Proceeding to a block 206, the transmitter 302 communicates the data signal $x_D(t)$ and pilot signal $x_P(t)$ over the channel to a receiver, e.g., the user terminal 104 as a received signal $y(t)=yD(t)+yp(t)$. Next at a block 210, the receiver 304 performs an inverse FFT to convert the received signal y(t) from the time domain into the frequency domain as Y(f).

Moving to a block 212, the receiver 304 derives an estimate $\hat{H}(f)$ of the channel characteristics in the frequency domain based on at least a portion of the known signal XP(f) and corresponding Yp(f). This estimation process is described in more detail with reference to FIG. 5. Next at a block 214, the receiver 304, based on the channel estimate $\hat{H}(f)$, generates an estimate of the received data signal $\hat{Y}(f)$ that includes residual ISI. This process is described in more detail with reference to FIG. 6.

Moving to a block 216, the receiver 304 performs an inverse FFT to convert the frequency domain received signal Y(t) to a time domain signal, y(t). Next at a block 220, the receiver 304 corrects the residual ISI to produce an estimated signal, $\hat{x}_d(t)$, of the data signal $x_d(t)$ In one embodiment, the receiver 304 corrects the residual ISI based on the difference between at least a portion of the known signal xP(t) and the received signal yP(t) that corresponds to the known signal. This process is described in more detail with reference to FIG. 7. Proceeding to a block 222, the receiver 304 demodulates the received data signal $\hat{x}_D(t)$ by decoding error correction or other encodings to provide the original sound, video, voice, or other data.

Figure 5:
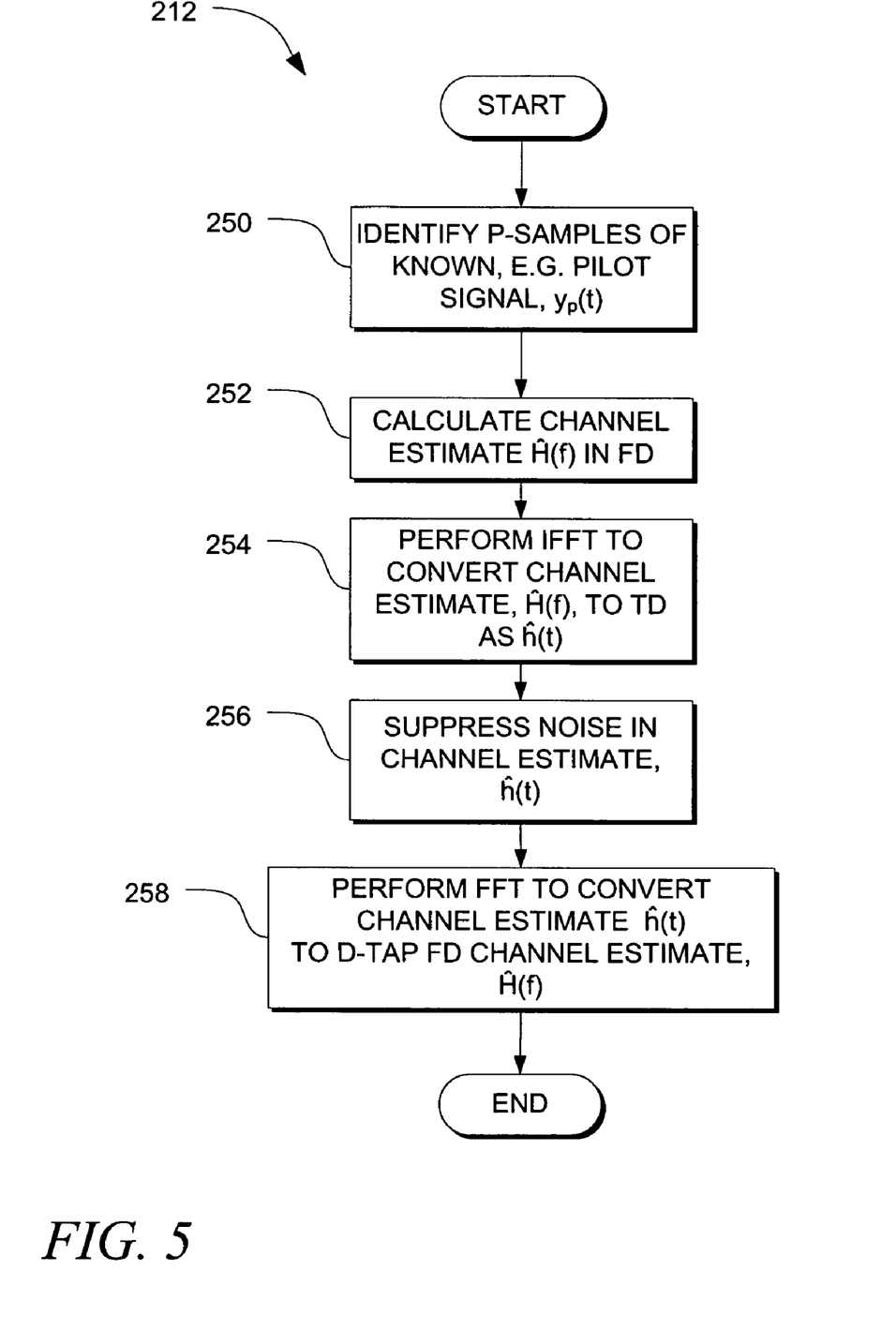
FIG. 5 is a flowchart illustrating an exemplary method of estimating the characteristics of a channel, such as in a portion of the method illustrated by FIG. 4.

FIG. 5 is a flowchart illustrating an exemplary method 212 of estimating the characteristics of a channel, $\hat{h}(t)$, such as in a portion of the method 200 illustrated by FIG. 4. At a block 250, the receiver 304 identifies P samples of the pilot signal yp(t) and performs an FFT to convert those samples to the frequency domain, e.g., Yp(f). Next at block 252, the receiver 304 derives a channel estimate $\hat{H}(f)$ based on the pilot signal Yp(f) as described above with reference to the channel estimator 134 of FIG. 3. In one embodiment, $\hat{H}(f)$ may be derived in discrete form, $\hat{H}[k]$ using equations 4 or 5.

Generally, data blocks are much longer than the number of pilot samples, P. For example, in the exemplary embodiment of FIG. 2, the data blocks include D=448 or 128 chips while the prefix and suffix blocks are only P=64 chips long. Thus, a mismatch exists between the number of discrete data points, or taps, of the channel estimate $\hat{H}(f)$ and the number of discrete data points, or taps, of the received signal Y(f). Thus, in one embodiment, as is further described with reference to blocks 254-258, the P-tap (e.g., having P number of discrete values) frequency domain channel estimate $\hat{H}(f)$ is converted to a D-tap (e.g., having D number of discrete values) frequency domain channel estimate for use in the equalization block 214 of FIG. 4. In particular, at a block 254 of FIG. 5, the receiver 304 performs an IFFT to convert the channel estimate $\hat{H}(f)$ to the time domain as $\hat{h}(t)$. Next at a block 256, the receiver 304 performs noise suppression (zero forcing) using a suitable threshold. In one embodiment, data points that are below a threshold, e.g., 10-30% of the maximum value in the data, are forced or set to zero, or removed from the channel estimate. Moving to block 258, the receiver 304 performs an FFT to convert the channel estimate $\hat{h}(t)$ to a D-tap (e.g., having D=448 values in one embodiment) frequency domain channel estimate $\hat{H}(f)$. The channel estimate $\hat{H}(f)$ is thus available for further processing of the received signal.

Figure 6:
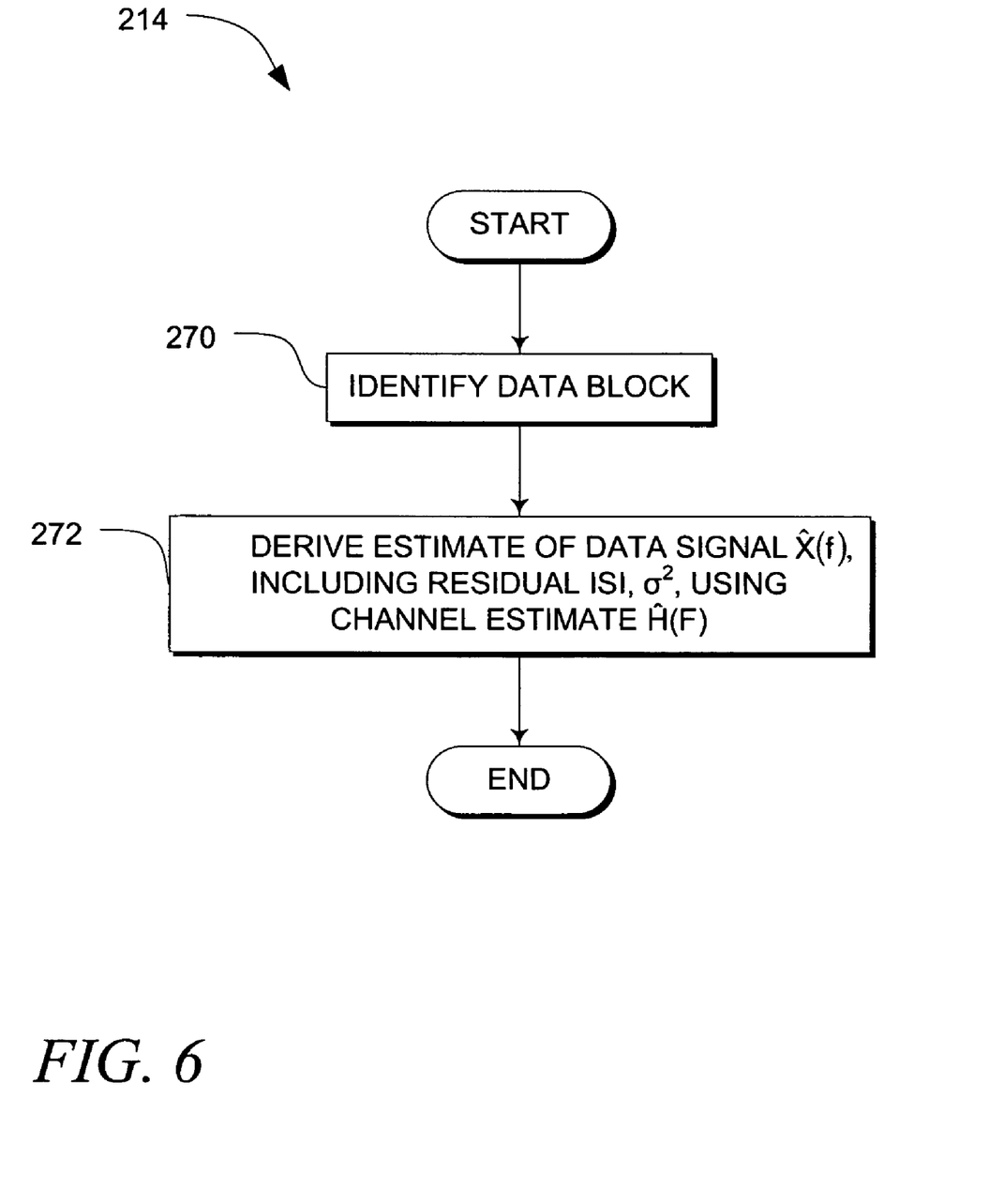
FIG. 6 is a flowchart illustrating an exemplary method of performing frequency domain equalization, such as in a portion of the method illustrated in FIG. 4.

FIG. 6 is a flowchart illustrating an exemplary method 214 of performing frequency domain equalization, such as in a portion of the method 200 illustrated in FIG. 4. At a block 270, the receiver 304 identifies a portion of the received signal, X(f). In one embodiment, the estimated signal X(f) includes a portion of the pilot signal XP(f). This included portion of the pilot signal is thus equalized as discussed with reference to FIG. 6 for use in later processing steps. Next at a block 272, the receiver 304 derives an estimate of the transmitted data signal $\hat{X}(f)$ including residual ISI, e.g., $\hat{X}(f)+\sigma^2$, based on the channel estimate $\hat{H}(f)$. In on embodiment, the estimated signal $\hat{X}(f)$ includes a data signal portion $\hat{X}_d(f)$ and a pilot signal portion $\hat{X}_P(f)$. In one embodiment, as discussed above with reference to estimator 136 of FIG. 3, the receiver 304 derives the estimated signal using a MMSE or ZF-MMSE discrete solution to the equation:

$$\hat{X}(f) = \frac{Y(f) \cdot \hat{H}^*(f)}{|\hat{H}(f)|^2 + \sigma^2}. \quad \text{(Eqn. 7)}$$

The equalized signal $\hat{X}(f)$ is thus provided for further processing.

Figure 7:
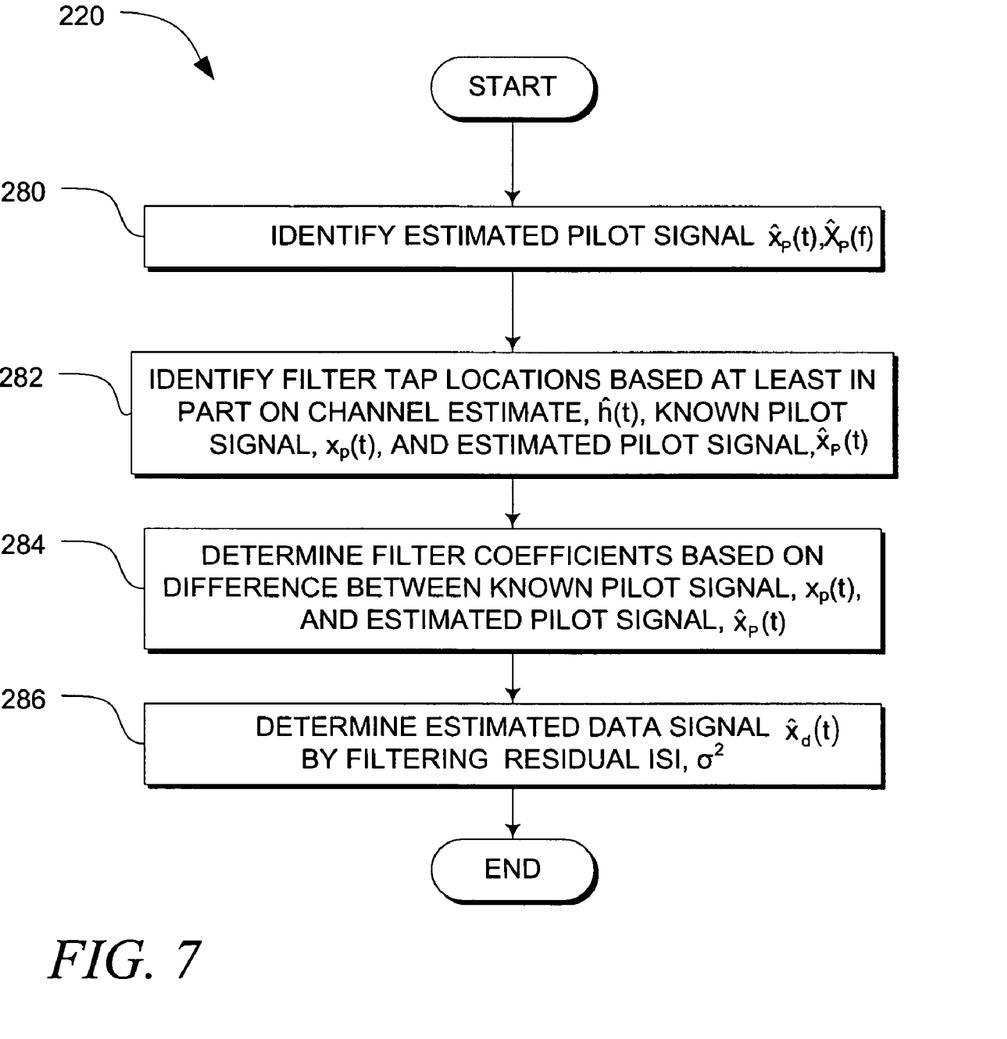
FIG. 7 is a flowchart illustrating an exemplary method of removing residual intersymbol interference (ISI), such as in a portion of the method illustrated in FIG. 4.

FIG. 7 is a flowchart illustrating an exemplary method 220 of removing residual intersymbol interference (ISI), such as in a portion of the method 200 illustrated in FIG. 4. At a block 280, the receiver 304 identifies an equalized portion of the pilot signal $\hat{x}_P(t)$ and $\hat{Y}P(f)$. In blocks 282-286, the receiver 304 uses the identified pilot signal $\hat{x}_P(t)/\hat{X}_P(f)$ to derive filter taps (data samples) and coefficients for performing a time domain equalization that filters the residual ISI from the equalized signal $\hat{x}_d(t)$. In particular, at a block 282, the receiver 304 identifies filter tap locations (data points used in the filter) based at least in part on the channel estimate, $\hat{h}(t)$, the known pilot signal, xP(t) (converted to the frequency domain as XP(f) and the estimated pilot signal, $\hat{X}_P(f)$. In one embodiment, the filter taps for use in the time domain filter can be represented in a discrete form as:

$$E[k] = \frac{1}{\sqrt{P}} \cdot \frac{1}{\hat{H}[k]} \cdot \frac{1}{X_P[k]} \cdot Y_P[k], \quad \text{(Eqn. 9)}$$

in the frequency domain; and $$e[n] = \frac{1}{\sqrt{P}} \cdot \sum_{k=-(P/2)}^{(P/2)-1} E[k] \cdot e^{-j \cdot 2 \cdot \pi \cdot k \cdot n/P}, \quad \text{(Eqn. 10)}$$

in the time domain.

In one embodiment, a suitable threshold is applied to these data points so that only more significant data points are selected for use in the filter. In one such embodiment, the threshold is a predetermined threshold that is selected so that only data points within about 6 db or 10% of the dominant tap (strongest, e.g., greatest value) are used. In another embodiment, the threshold is selected so that only taps within a threshold of between 1/10 and 1/4 of the dominant tap are used. In one embodiment, only the dominant tap is used.

Next at a block 284, the receiver 304 determines filter coefficients based on difference between the known pilot signal, xp(t), and the estimated pilot signal, $\hat{y}p(t)$. Assuming that an integer k different tap locations or data points were selected in block 282, which are represented as τk, the filter coefficients, a[k], may be derived in discrete form using a MMSE or ZF-MMSE solution of the following optimization problem to find optimized filter coefficient values a[k], e.g., aopt[k], that minimize a value indicative of the difference between the pilot signal xp(t) and the estimated pilot signal, $\hat{y}p(t)$ as represented below:

$$a_{opt}[k] = \underset{a}{\text{argmin}} \sum_{n=0}^{P-1} \left| \hat{y}_P(n) - \sum_k a[k] \cdot \hat{y}_P[n - \tau_k] - x_P[n] \right|^2 \quad \text{(Eqn. 11)}$$

Moving to a block 286, these taps and coefficients are used to filter the residual ISI from the received signal $\hat{y}(t)$. Again in discrete form, the data signals with the residual ISI removed may be derived using the following equation:

$$\hat{x}_D[n] = \hat{y}_D[n] - \sum_k a_{opt}[k] \hat{y}_D[n - \tau_k]. \quad \text{(Eqn.12)}$$

The equalized and filtered signals are thus provided to the demodulator for further processing.

It is to be recognized that, depending on the embodiment, certain acts or events of the methods described herein can be performed in a different sequence, may be added, merged, or left out all together (e.g., not all described acts or events are necessary for the practice of the various methods) without departing from the scope of the invention. Moreover, in certain embodiments, acts or events may be performed concurrently, e.g., through multi-threaded processing, interrupt processing, or multiple processors, rather than sequentially.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing a signal, the method comprising:
    receiving at a receiver a signal transmitted over a channel, the signal comprising an information signal and at least a portion of a known signal;
    determining at least one indicator of channel characteristics based at least in part on the portion of the known signal;
    generating a first value indicative of the information signal based at least in part on the at least one indicator of the channel characteristics, wherein the first value comprises an error signal; and
    removing the error signal from the first value of the signal in the time domain based at least in part on the portion of the known signal,
    wherein determining at least one indicator of the channel characteristics comprises determining an estimate of the channel characteristics in the frequency domain,
    wherein determining the at least one indicator of the channel characteristics further comprises transforming the estimate of the channel characteristics from a signal in the frequency domain comprising a first number of discrete values to a signal in the frequency domain comprising a second number of discrete values greater than the first number of discrete values, wherein the second number of discrete values corresponds to a number of discrete values of the information signal in the frequency domain,
    wherein removing the error signal comprises determining a second value indicative of the error signal by identifying filter tap locations based on the estimate of the channel characteristics, the portion of the known signal, and the portion of the known signal as received, and by determining coefficients for each of the filter tap locations based at least in part on a difference between the portion of the known signal as received and the known signal.

2. The method of claim 1, wherein the error signal is due at least in part to intersymbol interference.

3. The method of claim 1, wherein the known signal comprises a pilot signal.

4. The method of claim 1, wherein generating the first value comprises equalizing the received signal in the frequency domain based at least in part on the at least one indicator of the channel characteristics.

5. The method of claim 1, wherein removing the error signal comprises filtering the second value from the first value of the information signal using the identified filter tap locations and the corresponding coefficients.

6. The method of claim 1, wherein the known signal is characterized by a non-zero signal in the frequency domain.

7. The method of claim 1, wherein the filter tap locations are defined in discrete form in the frequency domain by $$E[k] = \frac{1}{\sqrt{P}} \cdot \frac{1}{\hat{H}[k]} \cdot \frac{1}{X_P[k]} \cdot Y_P[k], \quad \text{(Eqn. 9)}$$

where P is a number of samples of the portion of the known signal as received, $\hat{H}[k]$ is the estimate of the channel characteristics, $X_p[k]$ is the portion of the known signal, and $Y_p[k]$ is the portion of the known signal as received.

8. The method of claim 1, wherein the coefficients, $a_{opt}[k]$, are defined in discrete form by coefficients $a_k$ that satisfy $\operatorname{argmin}_a$ $$\sum_{n=0}^{P-1} \left| \hat{y}_P[n] - \sum_k a[k](\hat{y}_P[n - \tau_k]) - x_P[n] \right|^2,$$

where P is a number of samples of the portion of the known signal as received, $\hat{y}_p(t)$ is the portion of the known signal as received, $x_p(t)$ is the portion of the known signal, and $\tau_k$ represents a $k^{th}$ filter tap location.

9. A device configured to receive a signal transmitted over a channel, the signal comprising an information signal and at least a portion of known signal, the device comprising:
    a first circuit configured to determine at least one indicator of channel characteristics based at least in part on the portion of the known signal;
    a second circuit configured to generate a first value indicative of the information signal based at least in part on the at least one indicator of the channel characteristics, wherein the first value comprises an error signal; and
    a third circuit configured to remove the error signal from the first value of the signal in the time domain based at least in part on the portion of the known signal,
    wherein the first circuit is configured to determine an estimate of the channel characteristics in the frequency domain,
    wherein the first circuit is configured to transform the estimate of the channel characteristics from a signal in the frequency domain comprising a first number of discrete values to a signal in the frequency domain comprising a second number of discrete values greater than the first number of discrete values, wherein the second number of discrete values corresponds to a number of discrete values of the information signal in the frequency domain,
    wherein to remove the error signal, the third circuit is configured to determine a second value indicative of the error signal by identifying filter tap locations based on the estimate of the channel characteristics, the portion of the known signal, and the portion of the known signal as received, and by determining coefficients for each of the filter tap locations based at least in part on a difference between the portion of the known signal as received and the known signal.

10. The device of claim 9, wherein the error signal is due at least in part to intersymbol interference.

11. The device of claim 9, wherein the second circuit is configured to equalize the received signal in the frequency domain based at least in part on the at least one indicator of the channel characteristics.

12. The device of claim 9, wherein the third circuit is configured to filter the second value from the first value of the information signal using the identified filter tap locations and the corresponding coefficients.

13. The device of claim 9, wherein at least a portion of the first, second, and third circuit are formed on an integrated circuit.

14. The device of claim 9, further at least a portion of the first, second, and third circuit are implemented as a processor.

15. The device of claim 9, wherein the known signal is characterized by a non-zero signal in the frequency domain.

16. A device configured to receive a signal transmitted over a channel, the signal comprising an information signal and at least a portion of known signal, the device comprising:
    means for determining at least one indicator of channel characteristics based at least in part on the portion of the known signal;
    means for generating a first value indicative of the information signal based at least in part on the at least one indicator of the channel characteristics, wherein the first value comprises an error signal; and
    means for removing the error signal from the first value of the signal in the time domain based at least in part on the portion of the known signal,
    wherein the means for generating comprises means for determining an estimate of the channel characteristics in the frequency domain,
    wherein the means for generating comprises means for transforming the estimate of the channel characteristics from a signal in the frequency domain comprising a first number of discrete values to a signal in the frequency domain comprising a second number of discrete values greater than the first number of discrete values, wherein the second number of discrete values corresponds to a number of discrete values of the information signal in the frequency domain,
    wherein the means for removing the error signal determines a second value indicative of the error signal by identifying filter tap locations based on the estimate of the channel characteristics, the portion of the known signal, and the portion of the known signal as received, and by determining coefficients for each of the filter tap locations based at least in part on a difference between the portion of the known signal as received and the known signal.

17. The device of claim 16, wherein the error signal is due at least in part to intersymbol interference.

18. The device of claim 16, wherein the known signal comprises a pilot signal.

19. The device of claim 16 wherein the means for generating comprises means for equalizing the received signal in the frequency domain based at least in part on the at least one indicator of the channel characteristics.

20. The device of claim 16, wherein means for removing comprises means for filtering the second value from the first value of the information signal using the identified filter tap locations and the corresponding coefficients.

21. The device of claim 16, wherein the known signal is characterized by a non-zero signal in the frequency domain.

22. A non-transitory storage medium embodying instructions executable by a computer for performing the method comprising:
    receiving at a receiver a signal transmitted over a channel, the signal comprising an information signal and at least a portion of known signal;
    determining at least one indicator of channel characteristics based at least in part on the portion of the known signal;
    generating a first value indicative of the information signal based at least in part on the at least one indicator of the channel characteristics, wherein the first value comprises an error signal; and
    removing the error signal from the first value of the signal in the time domain based at least in part on the portion of the known signal,
    wherein determining at least one indicator of the channel characteristics comprises determining an estimate of the channel characteristics in the frequency domain,
    wherein determining the at least one indicator of the channel characteristics further comprises transforming the estimate of the channel characteristics from a signal in the frequency domain comprising a first number of discrete values to a signal in the frequency domain comprising a second number of discrete values greater than the first number of discrete values, wherein the second number of discrete values corresponds to a number of discrete values of the information signal in the frequency domain,
    wherein removing the error signal comprises determining a second value indicative of the error signal by identifying filter tap locations based on the estimate of the channel characteristics, the portion of the known signal, and the portion of the known signal as received, and by determining coefficients for each of the filter tap locations based at least in part on a difference between the portion of the known signal as received and the known signal.

23. The storage medium of claim 22, wherein generating the first value comprises equalizing the received signal in the frequency domain based at least in part on the at least one indicator of the channel characteristics.

24. The storage medium of claim 22, wherein the known signal is characterized by a non-zero signal in the frequency domain.

* * * * *